(12) United States Patent
Dong et al.

(10) Patent No.: US 11,379,326 B2
(45) Date of Patent: Jul. 5, 2022

(54) DATA ACCESS METHOD, APPARATUS AND COMPUTER PROGRAM PRODUCT

(71) Applicant: EMC IP Holding Company LLC, Hopkinton, MA (US)

(72) Inventors: Jibing Dong, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 261 days.

(21) Appl. No.: 16/824,032

(22) Filed: Mar. 19, 2020

(65) Prior Publication Data
US 2020/0341873 A1 Oct. 29, 2020

(30) Foreign Application Priority Data

Apr. 25, 2019 (CN) .......................... 201910340221.6

(51) Int. Cl.
G06F 11/00 (2006.01)
G06F 11/20 (2006.01)
G11B 20/18 (2006.01)
G11B 20/12 (2006.01)

(52) U.S. Cl.
CPC ...... *G06F 11/2094* (2013.01); *G11B 20/1889* (2013.01); *G06F 2201/82* (2013.01); *G11B 2020/1222* (2013.01)

(58) Field of Classification Search
CPC ............ G06F 11/1084; G06F 11/1662; G06F 11/2094; G06F 3/061; G06F 3/0617; G06F 3/0689; G11B 20/1889
See application file for complete search history.

(56) References Cited

U.S. PATENT DOCUMENTS

| | | | |
|---|---|---|---|
| 7,389,393 B1 | 6/2008 | Karr et al. | |
| 8,145,840 B2 * | 3/2012 | Koul | G06F 11/1076 711/114 |
| 8,578,094 B2 | 11/2013 | Chambliss et al. | |
| 8,839,028 B1 * | 9/2014 | Polia | G06F 11/1088 714/6.24 |
| 9,563,509 B2 * | 2/2017 | Han | G06F 11/1088 |
| 9,720,596 B1 | 8/2017 | Bono et al. | |
| 9,990,263 B1 * | 6/2018 | Tian | G06F 11/1092 |
| 10,901,646 B2 | 1/2021 | Hutchison et al. | |

OTHER PUBLICATIONS

Jin, Hai et al., A Raid Reconfiguration Scheme for Gracefully Degraded Operations, IEEE, Aug. 6, 2002 (Year: 2002).*
Wu, Suzhen et al., SOSRAID-6: A Self-Organized Strategy of RAID-6 in the Degraded Mode, 2008, IEEE (Year: 2008).*

* cited by examiner

Primary Examiner — Marc Duncan
(74) Attorney, Agent, or Firm — BainwoodHuang

(57) ABSTRACT

Techniques perform data access to a disk array. The disk array includes a parity disk and a plurality of data disks. Via such techniques, data is written to the parity disk in the disk array in response to a write request to a failed data disk in the disk array when the disk array is in a degraded state; and corresponding degraded storage position information is set in disk resource mapping information so as to indicate that the data are stored in the parity disk. Accordingly, enormous computing resources can be saved, and I/O operations required by reads in the degraded state can be reduced.

16 Claims, 9 Drawing Sheets

US 11,379,326 B2

DATA ACCESS METHOD, APPARATUS AND COMPUTER PROGRAM PRODUCT

CROSS REFERENCE TO RELATED APPLICATION

This application claims priority to Chinese Patent Application No. CN201910340221.6, on file at the China National Intellectual Property Administration (CNIPA), having a filing date of Apr. 25, 2019, and having "DATA ACCESS METHOD, APPARATUS AND COMPUTER PROGRAM PRODUCT" as a title, the contents and teachings of which are herein incorporated by reference in their entirety.

FIELD

Some embodiments of the present disclosure relate to the field of data storage, and more specifically, to a method, apparatus and computer program product for performing data access to a disk array.

SUMMARY

A storage system may be built based on one or more physical storage devices so as to provide data storage capacity. Redundant Array of Independent Disks (RAID) is a storage technology that combines a plurality of disks for data redundancy and access rate increase. According to the RAID technology, a plurality of groups of independent disks form one large-capacity group of disks, and data input/output (I/O) loads are evenly distributed among a plurality of physical disks by means of striping techniques. In other words, a continuous data block is evenly divided into several smaller blocks which are stored on the plurality of disks respectively, the plurality of disks logically belonging to the same storage device. Therefore, the throughput and access rate of the storage system can be increased by storing and reading data in parallel on the plurality of disks.

Furthermore, in the RAID technology, fault tolerance is provided through data check, so as to improve the system stability. In many RAID modes, there are provided complete check/recovery mechanisms, and some of them are even direct image backups of one another.

When hardware failures such as power off or disk removal occur, the RAID disk group will crash. Upon occurrence of a hardware failure, an optimized state that indicates normal operations will immediately switch to a degraded state, and after the hardware failure is removed, disks will be re-powered on and failure recovery will be performed. Usually in order to offer good user experience, even when the host is in the degraded state, it is still required to enable user access to the disk group.

Nevertheless, according to the prior art, I/O operations in the degraded state are quite cumbersome and inefficient. For example in RAID 5 mode, if I/O writes are performed to a failed disk in the degraded state, since the target disk fails, data cannot be written thereto and instead, corresponding parity information will be calculated and written to a parity disk. When I/O reads are performed to the data in the degraded state, the parity information and data in other storage disks will first be read, user data are then reconstructed based on the parity information and data read from the other storage disks, and finally reconstructed data are returned to the user. In addition, when a disk gets online again later and data needs to restored, user data have to be reconstructed once again based on the parity information and the data from the other disks, and reconstructed data need to be re-written to the disk that gets online again. Therefore, reads and writes in the degraded state are more cumbersome and inefficient than in the optimized state.

SUMMARY

In some embodiments of the present disclosure, there is provided a technical solution for performing data access to a disk array.

According to a first aspect of the present disclosure, there is provided a method for performing data access to a disk array. The disk array includes a parity disk and a plurality of data disks, and the method includes: writing data to the parity disk in the disk array in response to a write request to a failed data disk in the disk array when the disk array is in a degraded state; and setting corresponding degraded storage position information in disk resource mapping information so as to indicate that the data are stored in the parity disk.

According to a second aspect of the present disclosure, there is provided an apparatus for performing data access to a disk array. The apparatus includes: a processor; and a memory coupled to the processor, the memory having instructions stored thereon, the instructions, when executed by the processor, causing the apparatus to perform acts including: writing data to a parity disk in the disk array in response to a write request to a failed data disk in the disk array when the disk array is in a degraded state; and setting corresponding degraded storage position information in disk resource mapping information so as to indicate that the data are stored in the parity disk.

According to a third aspect of the present disclosure, there is provided a computer program product. The computer program product is tangibly stored on a computer readable medium and includes machine executable instructions which, when executed, cause a machine to perform acts in a method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure with reference to the accompanying drawings, the above and other objects, features and advantages of the present disclosure will become more apparent, wherein the same reference numerals typically represent the same components in the example embodiments of the present disclosure.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principle of the present disclosure will be described below in more detail with reference to several example embodiments illustrated in the accompanying drawings. Although the drawings illustrate the preferred embodiments of the present disclosure, it should be appreciated that the embodiments are provided to enable those skilled in the art to better understand and further implement the present disclosure, rather than limiting the scope of the present disclosure in any manner.

As used herein, the term "comprise" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

Figure 1:
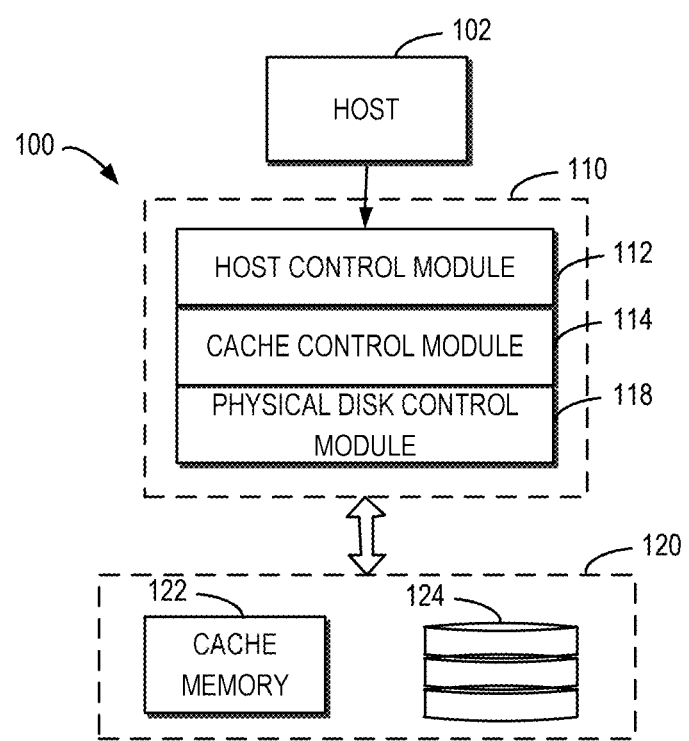
FIG. 1 illustrates a schematic view of an example environment in which some embodiments of the present disclosure may be implemented.

Reference is first made to FIG. 1, which illustrates a schematic diagram of an example environment in which the technical solution according to embodiments of the present disclosure may be implemented. A storage system 100 includes a physical storage device group 120 to provide data storage capacity. The physical storage device group 120 includes a cache memory 122 and a disk device 124. The cache memory 122 is used to cache data, and the disk device 124 is used for persistent storage of data. Usually the cache memory 122 has a higher access speed than the disk device 124. The storage system 100 may provide data storage capacity by means of various storage techniques.

In some embodiments, examples of the cache memory 122 include a cache, a random access memory (RAM), a dynamic random access memory (DRAM) and other memory with a higher access speed. Examples of the disk device 124 may include Redundant Array of Independent Disks (RAID) or other disk device.

To manage data storage in physical storage space, the storage system 100 further includes a storage controller 110. Usually the storage system 100 employs a hierarchical control model. As illustrated in FIG. 1, under the hierarchical control model, the storage controller 110 may have a plurality of layers of control modules, including a host control module 112, a cache control module 114 and a physical disk control module 116. These control modules implement hierarchical control functions.

To facilitate the understanding of the hierarchical control model of the storage system 100, description is made to the operation mechanism of the controller 110 in an example using the RAID technology. The physical disk control module 116 presents a logical unit number (LUN) device to the cache control module 114. The physical disk control module 116 controls the storage space of the disk device 124. The cache control module 114 controls cache space of the cache memory 122 to present a cache volume to the host control module 112. The host control module 112 manages a logical storage pool and presents the pool LUN to the host 102.

Upon operation, an application running on the host 102 may send a user write request to the host control module 112 so as to request to write data to the storage system 100. In response to the received user write request, the host control module 112 might generate a plurality of write requests for the cache control module 114. For example, if a user write request of the host 102 requires writing a large amount of data into multiple discrete extents of RAID LUN created by the hard disk device 124, the host control module 112 will send a write request to the cache control module 114 for each extent.

The cache control module 114 and the cache memory 122 operate in write-back mode. This means after receiving a write request, the cache control module 114 first caches data which are to be written upon the write request in the cache memory 122, and then releases data of write request(s) to a disk device 140. Upon completion of data cache, the cache control module 114 may send a completion indication of the write request to the host control module 112, thereby realizing a rapid response to the user write request. The physical disk control module 116 is used to control actual writes to the hard disk device 124.

It should be understood that the host control module 112, the cache control module 114 and the physical disk control module 116, though illustrated as different modules, may be implemented as a single or a plurality of processors, controllers, micro-processors with processing capability or a computing device including these devices. In some examples, the cache control module 114 may further be integrated with the cache memory 122 so as to obtain a device with both cache and control capabilities. Though not illustrated, in some embodiments, the storage system 100 may further include another storage controller as an image of the storage controller 110, so as to provide data consistency, security and data restoration capability. In some examples, the storage system 100 may further use a multi-core storage mechanism to implement data storage and management.

Figure 2:
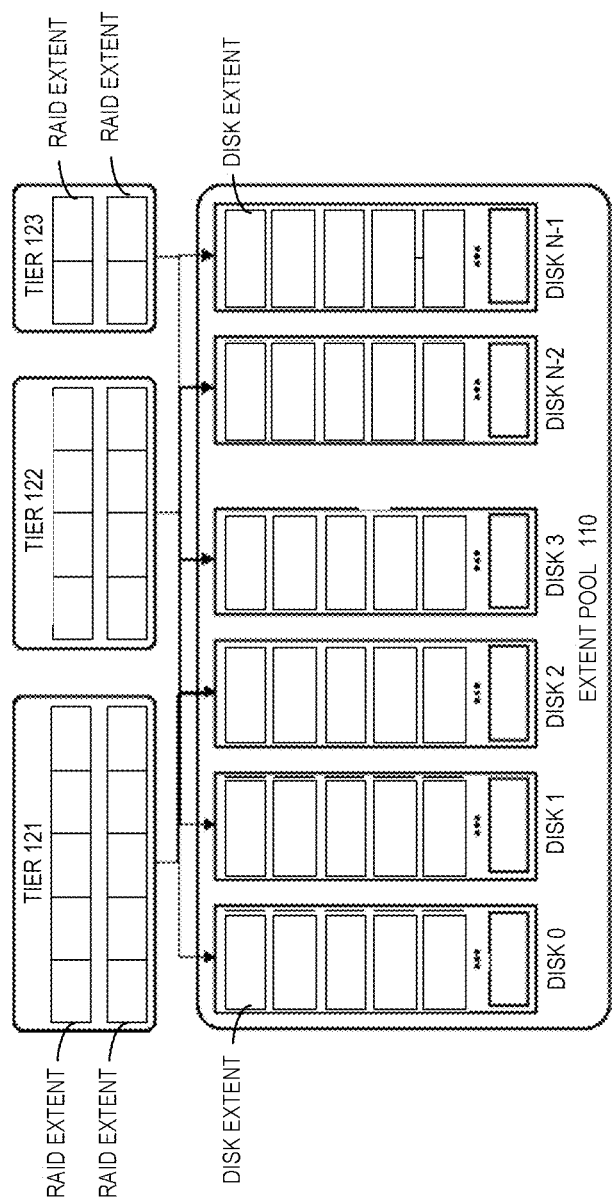
FIG. 2 illustrates an example building method for different storage tiers in a hierarchical storage system according to the prior art.

For the purpose of illustration, an introduction is first given to a building method for different storage tiers in a hierarchical storage system in the prior art with reference to FIG. 2. As illustrated, the storage system is provided with N physical disks, i.e., disk 0 to disk N−1. Each of disks 0 to N−1 is divided into several disk extents, which are put in an extent pool 110 for unified management. A RAID extent is formed by selecting a plurality of disk extents from disks, and the plurality of RAID extents jointly form different storage tiers 121 to 123. Each tier represents a combination of disks corresponding to a specific rate. Usually three storage tiers may be created for one storage pool, and each storage tier may be formed by a corresponding type of physical disks. For example, solid state disks (SSDs) may be used to form a high-performance SSD tier, namely Tier0; serial attachment small computer system interface (SAS) disks may be used to form a medium-performance SAS tier, namely Tier1; serial ATA SATA disks may be used to form a large-capacity SATA tier, namely Tier2. One volume may be distributed on a plurality of tiers, and depending on the activeness of volume I/O, data on the volume may move among different tiers so as to implement automatic hierarchical storage functionality.

As described above, in the prior art, if I/O writes is performed in the optimized state, data will be written to a corresponding data disk and corresponding parity information is written to a parity disk; when data is read, it will be directly read from the corresponding data disk. However, I/O operations in the degraded state are rather cumbersome and inefficient. For example, in RAID 5 mode, if I/O writes are performed on a failed disk in the degraded state, due to the target disk failure, data cannot be written to the target disk, but corresponding parity information will be calculated and written to a parity disk. When I/O reads are performed to the data in degraded state, parity information and data in other storage disks will first be obtained, user data will then be reconstructed based on the parity information and the data read from other disk, and finally reconstructed data will be returned to the user. In addition, when a disk gets online again subsequently and data are to be restored, user data need to be reconstructed again based on the parity information and the data from other disk, and reconstructed data need to be re-written to the disk that gets online again. Therefore, reads and writes in the degraded state are more cumbersome and inefficient than I/O operations in the optimized state.

To this end, in embodiments of the present disclosure, there is proposed to directly write, during a write operation to a failed disk in the degraded state, data to a parity disk instead of parity information. Thus, parity information does not need to be calculated during writes in the degraded state, which saves calculation operations. Moreover, when data is read in the degraded state, it only requires reading data directly from the parity disk, rather than reading parity information and data from other data disks and reconstructing data based on the parity information and read data as did in the prior art. In a further embodiment, during a failure recovery, parity information may be calculated and directly write to a data disk, so that no extra I/O operations and calculation operations will be caused during failure recovery. In addition, in a further implementation, when a re-write operation is performed to the data in the optimized state, the data may be written back to a data disk and parity information may be written to a parity disk. In this way, degraded write mode may be automatically switched back to a normal write mode without any extra I/O operations or computing resource consumption.

It is to be noted that the term "degraded write mode" used herein refers to a write mode in which data are directly written to a parity disk during writes to a failed data disk in the degraded state, as proposed in the present disclosure; the term "normal write mode" used herein refers to a write mode in which data are written to a data disk in the prior art.

The data access solution as proposed in the present application will be described by means of example embodiments with reference to FIGS. 3 to 12. It is to be noted that embodiments below are presented for the purpose of illustration only, and the present disclosure is not limited thereto.

Figure 3:
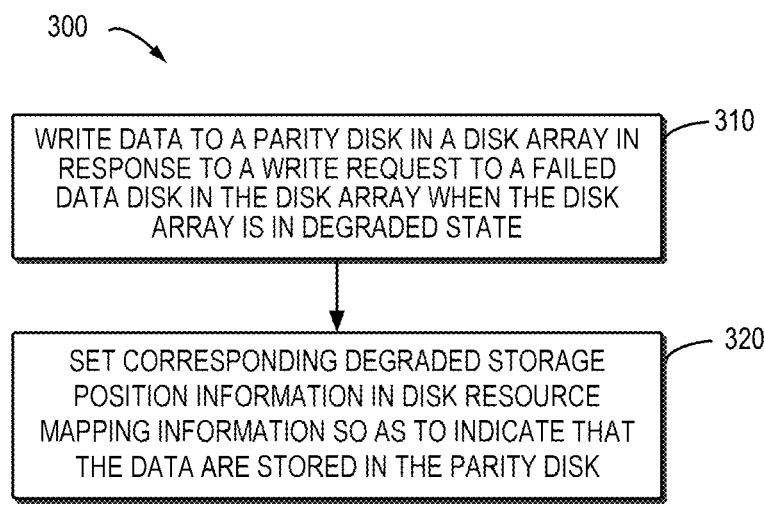
FIG. 3 illustrates a flowchart of a method 300 for performing data access to a disk array according to some embodiments of the present disclosure.

FIG. 3 illustrates a flowchart of a method 300 for performing data access to a disk array according to embodiments of the present disclosure. As illustrated, at block 310, data are written to a parity disk in a disk array in response to a write request to a failed data disk in the disk array when the disk array is in degraded state. In embodiments of the present disclosure, the disk array includes a parity disk and a plurality of data disks. The disk array is, for example, a disk group formed by RAID technology. With respect to RAID 5, the disk array includes one parity disk P and four data disks. It is to be noted that illustrations will be presented by taking RAID 5 as an example. However, the present disclosure is not limited thereto, instead the present disclosure may be applied to any other RAID mode and to any disk array which is formed based on any other technology and which includes a parity disk and the plurality of data disks.

At block 320, corresponding degraded storage position information is set in disk resource mapping information so as to indicate that the data are stored in the parity disk. Writes to a failed disk in the degraded state differ from that in a normal write mode, and in such a state, included in the parity disk is data rather than parity information. To support subsequent read I/O operations, such a storage position change may be indicated so that data may be directly obtained from the parity disk in subsequent operations. To this end, degraded storage position information may be included in disk resource mapping information so as to indicate whether data are stored in the parity disk or not. Therefore, when data writes in the degraded state are performed as proposed in the present disclosure, corresponding degraded storage position information may be set to indicate that the data are stored in the parity disk.

In some embodiments of the present disclosure, the disk resource mapping information includes a plurality of degraded storage position indicators for the plurality of data disks, i.e., a corresponding degraded storage indicator is set for each data disk. In this way, a degraded storage position indicator corresponding to the failed data disk may be set in the disk resource mapping information so as to indicate that data related to the failed data disk have been written to the parity disk.

In some embodiments of the present disclosure, the degraded storage position indicator may have a first value and a second value, wherein the first value corresponds to a valid value, "1" for example, so as to indicate that the data are stored in the parity disk; the second value may correspond to an invalid value, "0" for example, so as to indicate that the data are not stored in the parity disk. In this way, when corresponding degraded storage position information is set in the disk resource mapping information, the degraded storage position indicator may be set as the first value that indicates the data are stored in the parity disk, so as to indicate that the data are written to the parity disk.

Figure 4:
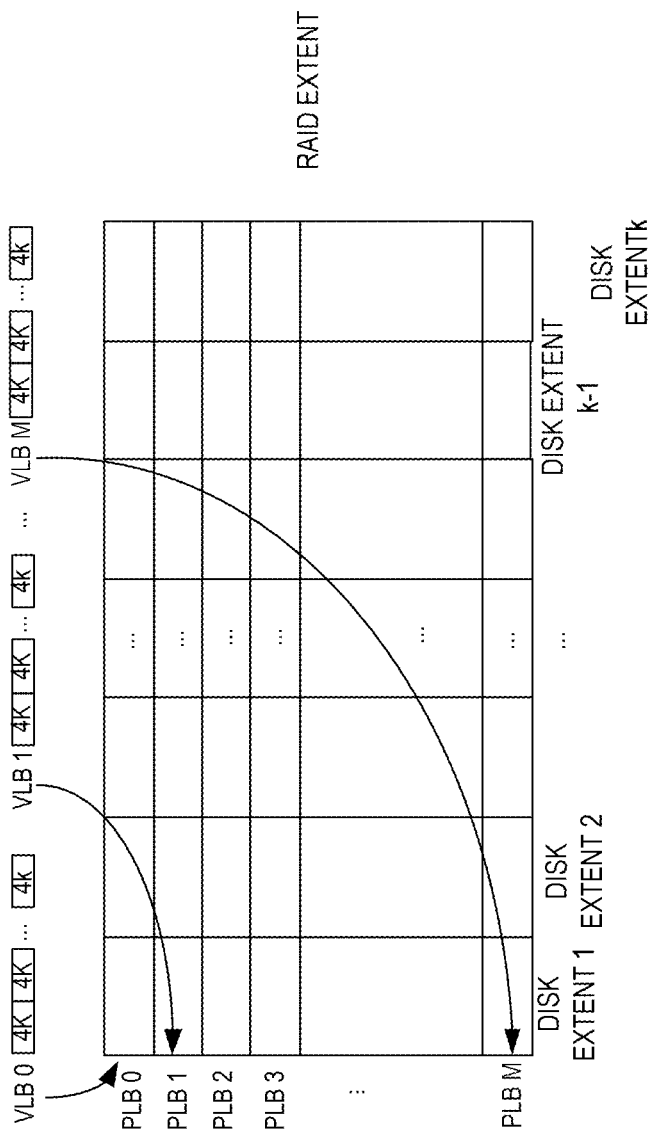
FIG. 4 schematically illustrates an example of disk resource mapping used in embodiments according to the present disclosure.

FIG. 4 schematically illustrates an example a feasible disk resource mapping mode according to embodiments of the present disclosure. In the figure, illustration is presented by taking RAID as an example, and embodiments of the present disclosure may implement the storage of degraded storage position information based on the example disk resource mapping.

A resource mapper is a log-based mapping system, which is used to manage a disk resource mapping in the storage system. The resource mapper provides a logical storage to the upper layer and maps the storage space to physical storage resources of RAID. As illustrated in FIG. 4, the logical space of the resource mapper is made up of pages in 4 KB size, each of which is used to store resource mapping information of a disk, a plurality of pages being packaged together to form a 2 MB-sized virtual block which is called virtual large block, i.e., VLB.

RAID extents are divided into a plurality of physical large blocks (PLBs), i.e., PLB 0 to PLB M, each of which includes disk extent 1 to disk extent k from different disks. Each PLB includes storage resources from each disk extent of RAID extents. With respect to PLB, corresponding VLB is provided to store resource mapping information on the PLB. The data structure of VLB contains information on mapping from VLB to PLB. The resource mapper may reference pages in VLB by using a three-level B+ tree structure, wherein a block pointer in a leaf entry of the B+ tree points to a page of VLB.

According to some embodiments of the present disclosure, the degraded storage position information may be stored in VLB which is used to store the disk resource mapping information. Thus, when reading data, the degraded storage position information and other disk resource mapping information may be read simultaneously without extra read operations. For example, a degraded storage position indicator corresponding to each data disk may be set in VLB.

Figure 5:
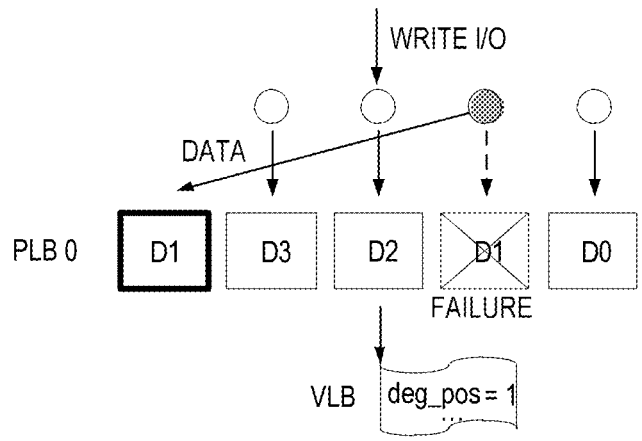
FIG. 5 illustrates a schematic view of a data write operation in the degraded state according to some embodiments of the present disclosure.

Hereinafter, reference will be made to FIG. 5 to describe an example write operation to a disk array in the degraded state, wherein there is illustrated a scenario in which a data write is performed to one PLB of RAID extents. As illustrated in FIG. 5, in one PLB, four disk extents from four disks are used to store a plurality of data versions respectively, and a parity disk is used to store corresponding parity information. In this embodiment, a degraded storage position indicator depos is added in the VLB of the resource mapper, so as to record which data disk has data recorded on a parity position.

As illustrated in FIG. 5, when performing a write operation to the illustrated PLB in the degraded state, a write I/O operation to an intact data disk may proceed normally, i.e., a plurality of versions D0, D2 and D3 of data may be directly written to corresponding data disks. The solution as proposed in the present disclosure is used to a write I/O operation to a failed data disk, i.e., data D1 that would have been written to the failed data disk will be directly written to a parity disk without calculating and storing parity information, just as illustrated in FIG. 5. Upon completion of the write operation, a degraded storage position indicator value corresponding to the failed data disk is stored in VLB so as to indicate that data are stored in the parity disk.

Specifically, during data flush, the resource mapper may allocate VLB and PLB for dirty pages to which writes were already performed. Then, the resource mapper sends a full PLB write to RAID. During the PLB write, if the disk extent of PLB is in the optimized state, then the write is performed normally, and the INVALID "0" degraded storage position indicator is returned to the resource mapper. On the contrary, if the disk extent of PLB is in the degraded state, then degraded data are written to a corresponding position in the parity disk instead of the data disk, and meanwhile the valid degraded storage position indicator is returned to the mapper. After the write I/O operation is returned to the resource mapper, the resource mapper may store the degraded storage position indicator in the corresponding VLB.

Therefore, with the degraded write mode in the present disclosure, during writes to a failed disk in degraded state, parity information does not need to be calculated and stored, so lots of CPU cycle can be saved. Moreover, when performing read operations to the data in degraded state, data are directly read from the parity disk, rather than reading parity information and data from other data disk and reconstructing data based on the parity information and the read data as did in the prior art.

Figure 6:
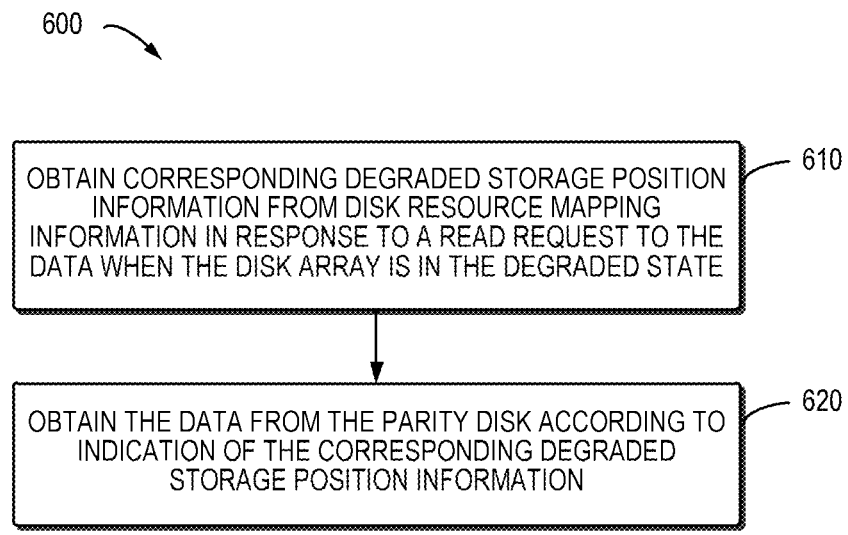
FIG. 6 illustrates a flowchart of a method 600 for performing data access to a disk array according to some embodiments of the present disclosure.

FIG. 6 illustrates a flowchart of a method 600 for performing data access to a disk array according to some embodiments of the present disclosure, wherein an example I/O read operation to a failed disk in degraded state is illustrated. As illustrated, at block 610, corresponding degraded storage position information is obtained from the disk resource mapping information in response to a read request to the data when the disk array is in an optimized state. Then at block 620, the data are obtained from the parity disk according to the indication of the corresponding degraded storage position information.

Therefore, in the degraded state, when performing a read operation to data written in degraded write mode, degraded storage position information may be first obtained. As indicated by the degraded storage position information, "deg_pos=1," this means corresponding data were written to the parity disk. Therefore, data may be directly obtained from the parity disk, instead of performing data reconstruction as did in the prior art. In this way, I/O operations may be reduced significantly, and enormous resources may be saved.

On the other hand, regarding data written in a normal write mode, also degraded storage position information will be obtained first too. However, since the degraded storage position information is in invalid state, data will still be obtained from a corresponding position in a data disk. As the degraded storage position information is stored in VLB together with the resource mapping information, they may be read together without extra read operations. Moreover, assumption of computing resources may be ignored. This means according to embodiments of the present disclosure, no impact will be exerted on the performance of normal data read operations in degraded state.

Figure 7:
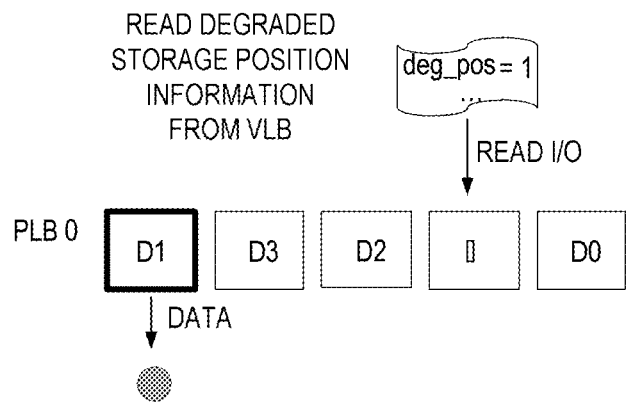
FIG. 7 illustrates a schematic view of a data read operation in the degraded state according to some embodiments of the present disclosure.

FIG. 7 illustrates a schematic view of a data read operation in the degraded state according to some embodiments of the present disclosure. As illustrated, in a case of cache miss for a data access, the resource mapper will read the VLB first to get degraded storage position information and mapping information of a leaf node entry of the B+ tree. Then, the resource mapper sends the degraded storage position information deg_pos in VLB together with the read I/O to RAID indicated by the mapping information. If the degraded position is invalid, i.e., the I/O read operation is not directed to the failed data disk, sub I/O will be sent to a storage position in a data disk so as to read data in a normal way, i.e., data will be read from a data disk. If the failed disk is read and the degraded storage information is valid, then according to the solution proposed in the present disclosure, the sub I/O is sent to a corresponding position in the parity disk instead of a storage position in the data disk.

Therefore, when performing a read operation to data written in the degraded mode in degraded state, read may be directly read from the parity disk, without reading data and parity information from other data disks and reconstructing data based on the parity information and the read data. Therefore, I/O operations may be saved, and lots of CPU cycles may be saved too.

Further, according to some embodiments of the present disclosure, during failure recovery, both a data storage position and a parity information storage position are restored to the normal state and the degraded storage position information is set as invalid, so that all storage positions become normal in an optimized state. Thus, storage positions of all data are normal in an optimized state, and data may be directly obtained from a data disk without focusing on a value of the degraded storage position information.

However, according to other embodiments of the present disclosure, during failure recovery, the parity information may be directly stored in a data disk without changing the storage position of data written in the degraded write mode in degradation. When the data are accessed subsequently, new data will be written to a data disk and parity information will be written to the parity disk. Hereinafter, reference will be made to FIGS. 8 to 11 to describe relevant operations.

Figure 8:
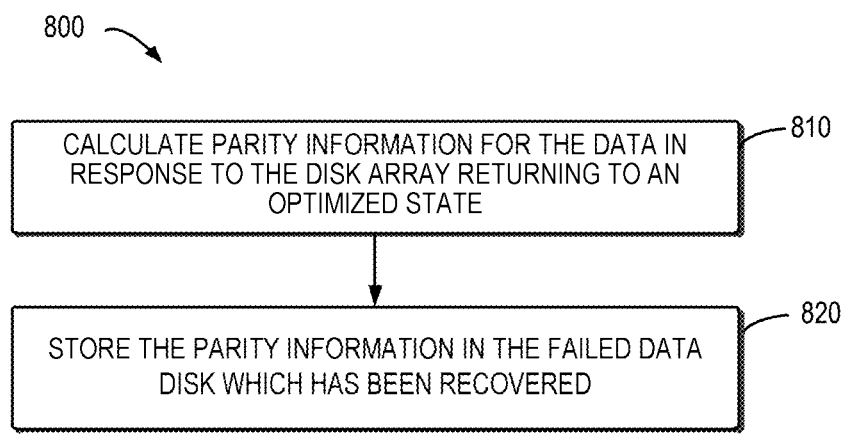
FIG. 8 illustrates a flowchart of a method 800 for performing data recovery to a disk array according to some embodiments of the present disclosure.

FIG. 8 illustrates a flowchart of a method 800 for performing data recovery to a disk array according to some embodiments of the present disclosure. As illustrated, at block 810, in response to the disk array returning to the optimized state, data for other data disks and data stored in the parity disk are calculated, and corresponding parity information is calculated according to the above data. Then at block 820, the parity information may be stored in the failed data disk that is already recovered. Therefore, according to embodiments of the present disclosure, during failure recovery, the calculated parity information may be directly stored in the failed data disk that is already recovered without switching storage positions of the data and the parity information. Therefore, I/O operations may be reduced, and bandwidth resources may be saved too.

In a case of the degraded storage position information is stored in the resource mapping information, data reconstruction during failure recovery may be performed with the collaboration between the resource mapper and RAID.

Figure 9:
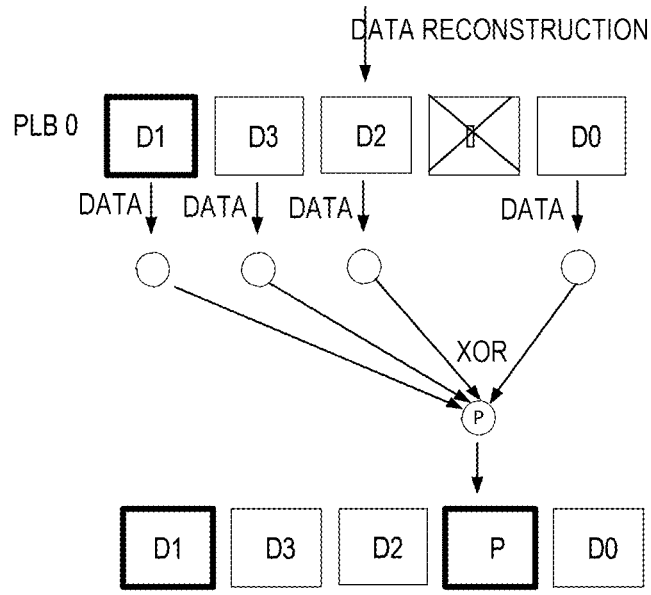
FIG. 9 illustrates a schematic view of a failure recovery operation when returning to the optimized state according to some embodiments of the present disclosure.

FIG. 9 illustrates a schematic view of failure recovery operations when returning the optimized state according to some embodiments of the present disclosure. As illustrated, in the degraded state, if the failed disk gets online again, the resource mapper first reads VLB so as to obtain the degraded storage position information. Then, the resource mapper sends an I/O operation to the degraded storage position so as to read the whole PLB. At this point, RAID will first read D0, D2 and D3 from storage positions of intact data disks and read data D1 from the parity position. The resource mapper will issue a fix write operation to RAID with the data D0, D1, D2 and D3. Specifically, RAID calculates the parity data according to D0, D1, D2 and D3 and then writes the calculated parity data to a position in the recovered data disk.

Further, according to embodiments of the present disclosure, a storage position of data in the disk system and a storage position of the parity information are switched through a subsequent write I/O operation, and then the degraded storage position information is set as invalid and returned to the resource mapper. The mapper stores the corresponding degraded storage position information in VLB metadata.

Figure 10:
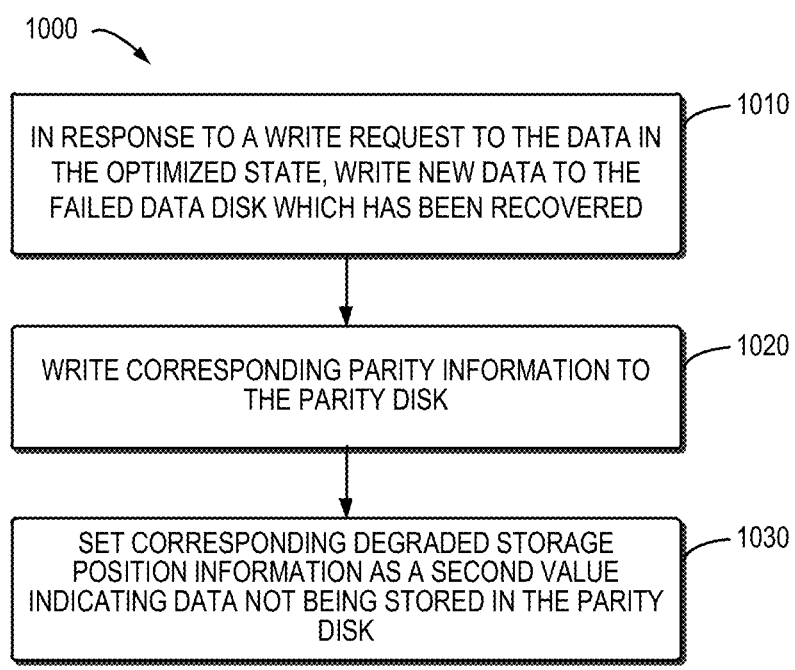
FIG. 10 illustrates a flowchart of a method 1000 for performing data access to a disk array according to some embodiments of the present disclosure.

FIG. 10 illustrates a flowchart of a method 1000 for performing data access to a disk array according to some embodiments of the present disclosure. As illustrated, at block 1010, in response to a write request to the data in the optimized state, new data are written to a recovered failed data disk. At block 1020, corresponding parity information is written to the parity disk. At block 1030, corresponding degraded storage position information is set as a second value indicating that data are not stored in the parity disk. In this way, storage positions of parity information and data written in the degraded write mode may be switched to the normal storage state.

Figure 11:
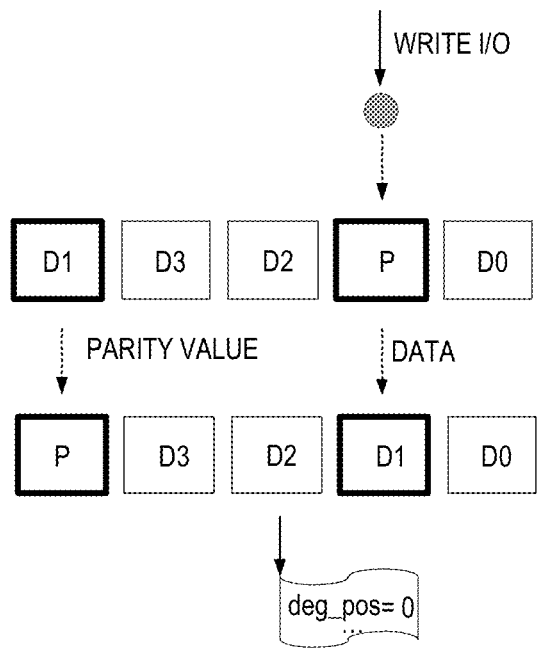
FIG. 11 illustrates a schematic view of a data write operation after returning to the optimized state according to some embodiments of the present disclosure.

FIG. 11 illustrates a schematic view of a data write operation after returning to optimized state according to some embodiments of the present disclosure. As illustrated, when a write I/O operation is performed to data written in the degraded write mode in an optimized state, the data write operation is performed normally, i.e., data D0, D1, D2 and D3 are written to corresponding positions in data disks and parity information is written to a corresponding position in the parity disk. Meanwhile, the degraded storage position indicator is set as invalid. In this way, it is possible to switch back to the normal data storage by means of a subsequent write operation, without extra I/O operations. Therefore, bandwidth resources may be saved.

Figure 12:
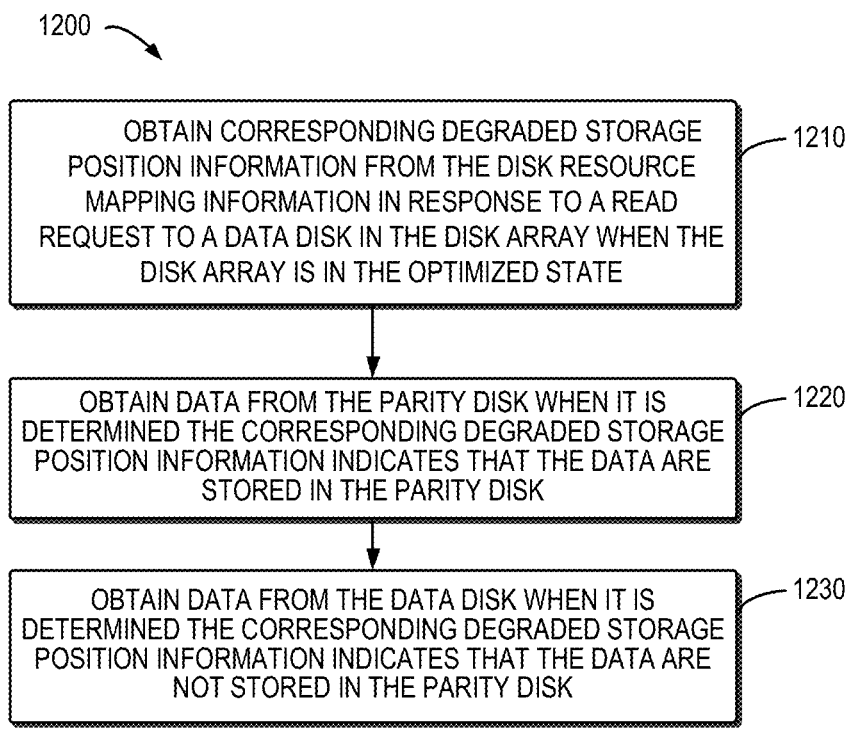
FIG. 12 illustrates a flowchart of a method 1200 for performing data access to a disk array according to some embodiments of the present disclosure.

FIG. 12 illustrates a flowchart of a method 1200 for performing data access to a disk array according to some embodiments of the present disclosure, wherein an I/O read operation in an optimized state is illustrated. As illustrated, at block 1210, in response to a read request to a data disk in the disk array when the disk array is in the optimized state, corresponding degraded storage position information is obtained from the disk resource mapping information. At block 1220, when it is determined the corresponding degraded storage position information indicates the data are stored in the parity disk, data are obtained from the parity disk. At block 1230, where it is determined the corresponding degraded storage position information indicates the data are not stored in the parity disk, data are obtained from the data disk.

It is to be noted that the data access solution as proposed in the present disclosure does not exert any impact on a data access operation in an optimized state. In embodiments of the present disclosure, degraded storage position information may be stored together with resource mapping information, so they may be read together without extra read operations, and the assumption of computing resources may also be ignored. Therefore, according to embodiments of the present disclosure, no impact will be exerted on the performance of a normal data read operation in an optimized state.

Figure 13:
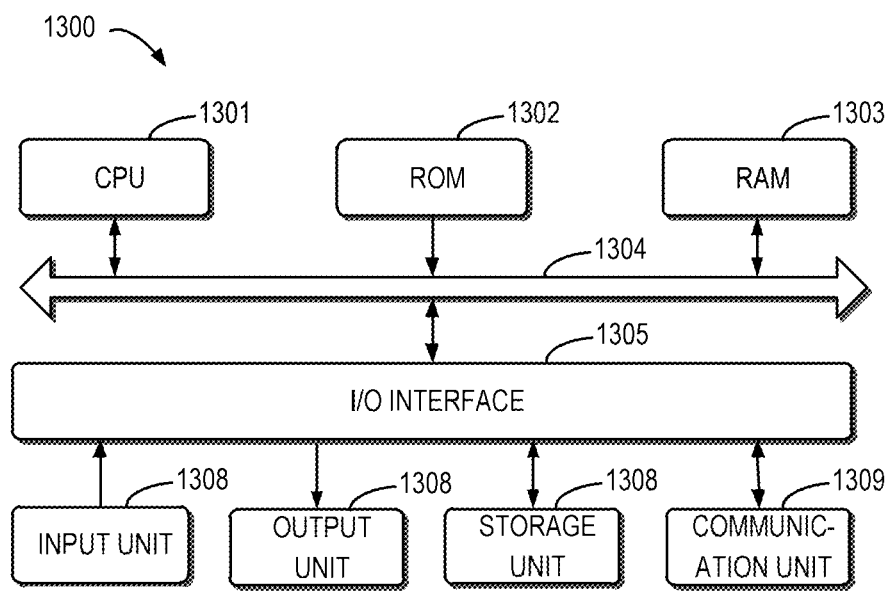
FIG. 13 illustrates a schematic block diagram of an example device 1300 which is applicable to implement embodiments of the present disclosure.

In addition, FIG. 13 illustrates a schematic block diagram of an example device 1300 which is suitable to implement some embodiments of the present disclosure. The device 1300 may be used to implement one or more control modules of the storage controller 110 in FIG. 1.

As illustrated, the device 1300 includes a central process unit (CPU) 1301, which can execute various suitable actions and processing in accordance with the computer program instructions stored in a read-only memory (ROM) 1302 or computer program instructions loaded to a random-access memory (RAM) 1303 from a storage unit 1308. In the RAM 1303 are also stored various programs and data required by the operations of the device 1300. The CPU 1301, ROM 1302 and RAM 1303 are connected to one another via a bus 1304. The input/output (I/O) interface 1305 is also connected to the bus 1304.

Connected to the I/O interface 1305 are a plurality of components in the device 1300 including: an input unit 1306, such as a keyboard, a mouse and the like; an output unit 1307, such as various kinds of displays and speakers etc.; a storage unit 1308 such as a magnetic disk and an optical disk etc.; and a communication unit 1309 such as a network card, a modem, a wireless transceiver and the like. The communication unit 1309 allows the device 1300 to exchange information/data with other devices via the computer network such as Internet, and/or various telecommunication networks.

The processing unit 1301 performs various methods and processes described above, such as any of the methods 300, 600, 800, 1000 and 1200. For example, in some embodiments, any one or more of the methods 300, 600, 800, 1000 and 1200 can be implemented as a computer software program tangibly included in the machine-readable medium, e.g., the storage unit 1308. In some embodiments, the computer program can be partially or fully loaded and/or installed on the device 1300 via ROM 1302 and/or the communication unit 1309. When the computer program is loaded to the RAM 1303 and executed by the CPU 1301, one or more steps of the above described one or more of the methods 300, 600, 800, 1000 and 1200 can be implemented. Alternatively, in other embodiments, the CPU 1301 also can be configured to realize one or more of the methods 300, 600, 800, 1000 and 1200 in any other suitable manners (e.g., by means of firmware).

Those skilled in the art should understand that various steps of the above methods of the present disclosure may be performed by a general-purpose computing device, which may be centralized on a single computing device or distributed on a network formed by a plurality of computing devices. Alternatively, they may be implemented by computing device executable program codes, so that they may be stored in a storage device and executed by a computing device or by fabricating them into various integrated circuit modules respectively, or fabricating a plurality of modules or steps of them into a single integrated circuit module. Therefore, the present disclosure is not limited to any specific combination of hardware and software.

It should be appreciated that although several means or sub-means (e.g., specialized circuitry) of the device are mentioned in the above detailed description, such division is merely an example and not mandatory. In fact, according to embodiments of the present disclosure, features and functions of two or more means described above may be embodied in one means. Conversely, the feature and function of one means described above may be further divided and embodied by multiple means.

Embodiments described above are only some optional embodiments of the present disclosure, and are not intended to limit the present disclosure; those skilled in the art appreciate that various changes and modifications may be made to the present disclosure. Any modifications, equivalent substitutions, improvements, etc., made within the spirit and scope of the present disclosure, are intended to be contained within the scope of the present disclosure.

We claim:

1. A method for performing data access to a disk array, wherein the disk array comprises a parity disk and a plurality of data disks, the method comprising:
   writing data to the parity disk in the disk array in response to a write request to a failed data disk in the disk array when the disk array is in a degraded state;
   setting corresponding degraded storage position information in disk resource mapping information so as to indicate that the data are stored in the parity disk;
   calculating parity information for the data in response to the disk array returning to an optimized state; and
   storing the parity information in the failed data disk which has been recovered.

2. The method of claim 1, wherein the disk resource mapping information comprises a plurality of degraded storage position indicators for the plurality of data disks, and wherein the setting corresponding degraded position information in the disk resource mapping information comprises setting in the disk resource mapping information a degraded storage position indicator corresponding to the failed data disk.

3. The method of claim 2, wherein the setting corresponding degraded storage position information in the disk resource mapping information comprises setting the degraded storage position indicator as a first value indicating that the data are stored in the parity disk.

4. The method of claim 2, further comprising:
   obtaining the corresponding degraded storage position information from the disk resource mapping information in response to a read request to the data when the disk array is in the degraded state; and
   obtaining the data from the parity disk according to indication of the corresponding degraded storage position information.

5. The method of claim 2, further comprising:
   obtaining corresponding degraded storage position information from the disk resource mapping information in response to a read request to a data disk in the disk array when the disk array is in an optimized state;
   obtaining data from the parity disk when it is determined the corresponding degraded storage position information indicates that the data are stored in the parity disk; and
   obtaining data from the data disk when it is determined the corresponding degraded storage position information indicates that the data are not stored in the parity disk.

6. The method of claim 1, further comprising:
   in response to a write request to the data in the optimized state, writing new data to the failed data disk which has been recovered;
   writing corresponding parity information to the parity disk; and
   setting corresponding degraded storage position information as a second value indicating that the data are not stored in the parity disk.

7. An apparatus for performing data access to a disk array, wherein the disk array comprises a parity disk and a plurality of data disks, the apparatus comprising:
   a processor; and
   a memory coupled to the processor and having instructions stored therein, the instructions, when executed by the processor, causing the apparatus to perform acts comprising:

writing data to the parity disk in the disk array in response to a write request to a failed data disk in the disk array when the disk array is in a degraded state;

setting corresponding degraded storage position information in disk resource mapping information so as to indicate that the data are stored in the parity disk;

calculating parity information for the data in response to the disk array returning to an optimized state; and storing the parity information in the failed data disk which has been recovered.

8. The apparatus of claim 7, wherein the disk resource mapping information comprises a plurality of degraded storage position indicators for the plurality of data disks, and wherein the setting corresponding degraded position information in the disk resource mapping information comprises setting in the disk resource mapping information a degraded storage position indicator corresponding to the failed data disk.

9. The apparatus of claim 8, wherein the setting corresponding degraded storage position information in the disk resource mapping information comprises setting the degraded storage position indicator as a first value indicating that the data are stored in the parity disk.

10. The apparatus of claim 8, wherein the acts further comprise:

obtaining the corresponding degraded storage position information from the disk resource mapping information in response to a read request to the data when the disk array is in the degraded state; and obtaining the data from the parity disk according to indication of the corresponding degraded storage position information.

11. The apparatus of claim 8, wherein the acts further comprise:

obtaining corresponding degraded storage position information from the disk resource mapping information in response to a read request to a data disk in the disk array when the disk array is in an optimized state;

obtaining data from the parity disk when it is determined the corresponding degraded storage position information indicating that the data are stored in the parity disk; and obtaining data from the data disk when it is determined the corresponding degraded storage position information indicates that the data are not stored in the parity disk.

12. The apparatus of claim 7, wherein the acts further comprise:

in response to a write request to the data in the optimized state, writing new data to the failed data disk which has been recovered;

writing corresponding parity information to the parity disk; and setting corresponding degraded storage position information as a second value indicating that the data are not stored in the parity disk.

13. A computer program product having a non-transitory computer readable medium which stores a set of instructions to perform data access to a disk array, wherein the disk array includes a parity disk and a plurality of data disks; the set of instructions, when carried out by computerized circuitry, causing the computerized circuitry to perform a method of:

writing data to the parity disk in the disk array in response to a write request to a failed data disk in the disk array when the disk array is in a degraded state; and setting corresponding degraded storage position information in disk resource mapping information so as to indicate that the data are stored in the parity disk, wherein the disk resource mapping information comprises a plurality of degraded storage position indicators for each of the plurality of data disks, and wherein the setting corresponding degraded position information in the disk resource mapping information comprises setting in the disk resource mapping information a degraded storage position indicator corresponding to the failed data disk.

14. The computer program product of claim 13, wherein the method further comprises:

in response to a request to read data, reading the degraded storage position information together with a set of other disk resource mapping information without additional read operations.

15. The computer program product of claim 14, wherein the disk resource mapping information is stored in a virtual block structure, and wherein reading the degraded storage position information together with a set of other disk resource mapping information without additional read operations includes:

accessing the virtual block structure; and reading the disk resource mapping information.

16. The computer program product of claim 13, wherein the method further comprises:

in response to a write request to the plurality of data disks in the disk array, obtaining a corresponding plurality of degraded storage position indicators from the disk resource mapping information;

identifying a set of data disks in the disk array that are not in a failed state by analyzing the corresponding plurality of degraded storage position indicators; and writing data to the set of data disks in the disk array that are not in a failed state.

* * * * *